(12) United States Patent
Mayer et al.

(10) Patent No.: US 10,065,335 B2
(45) Date of Patent: *Sep. 4, 2018

(54) OVERLAPPING APPARATUS AND METHOD

(71) Applicant: Textor Maschinenbau GmbH, Wolfertschwenden (DE)

(72) Inventors: Josef Mayer, Memmingerberg (DE); Wilfried Maier, Dietmannsried (DE); Jörg Schmeiser, Wiggensbach (DE)

(73) Assignee: TEXTOR MASCHINEBAU GMBH, Wolfertschwenden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/710,437

(22) Filed: Sep. 20, 2017

(65) Prior Publication Data
US 2018/0037423 A1 Feb. 8, 2018

Related U.S. Application Data

(63) Continuation of application No. 15/069,318, filed on Mar. 14, 2016, now Pat. No. 9,809,401.

(30) Foreign Application Priority Data

Mar. 18, 2015 (DE) .......................... 10 2015 104 055

(51) Int. Cl.
| | | |
|---|---|---|
| *B65G 57/32* | (2006.01) |
| *B65G 47/08* | (2006.01) |
| *B26D 7/32* | (2006.01) |
| *B65G 41/00* | (2006.01) |
| *B65G 47/68* | (2006.01) |
| *B65G 15/50* | (2006.01) |

(52) U.S. Cl.
CPC ............... *B26D 7/32* (2013.01); *B65G 15/50* (2013.01); *B65G 41/00* (2013.01); *B65G 47/084* (2013.01); *B65G 47/68* (2013.01); *B65G 57/32* (2013.01); *B26D 2210/02* (2013.01)

(58) Field of Classification Search
CPC .................................... B65G 7/32; B62D 7/32
See application file for complete search history.

(56) References Cited

U.S. PATENT DOCUMENTS

| | | | | |
|---|---|---|---|---|
| 4,645,061 A * | 2/1987 | Welch | ................... | B65G 57/32 198/418.4 |
| 5,566,600 A * | 10/1996 | Johnson | ............... | B26D 1/0006 83/110 |
| 6,152,284 A * | 11/2000 | Sandberg | ............... | B65G 47/52 198/432 |

(Continued)

FOREIGN PATENT DOCUMENTS

| | | | | |
|---|---|---|---|---|
| DE | 3642123 A1 * | 6/1988 | ............... | B65D 7/32 |
| DE | 3642123 A1 | 6/1988 | | |

(Continued)

OTHER PUBLICATIONS

Extended German search report for related German application No. 102015104055.7, dated Feb. 23, 2016, pp. 9.

*Primary Examiner* — Thomas Randazzo
(74) *Attorney, Agent, or Firm* — Cantor Colburn LLP

(57) ABSTRACT

An apparatus for the lateral overlapping of portions which are transported in a longitudinal direction and which each comprise at least one slice cut off from a food product is provided.

38 Claims, 11 Drawing Sheets

(56) References Cited

U.S. PATENT DOCUMENTS

| | | | | |
|---|---|---|---|---|
| 6,763,748 | B2* | 7/2004 | Wolcott | B26D 7/32 |
| | | | | 83/155 |
| 6,935,215 | B2* | 8/2005 | Lindee | B26D 7/0683 |
| | | | | 83/155 |
| 7,114,609 | B2* | 10/2006 | Christman | B65B 25/146 |
| | | | | 198/442 |
| 9,809,401 | B2* | 11/2017 | Mayer | B65G 57/32 |
| 2004/0016331 | A1 | 1/2004 | Wolcott et al. | |
| 2014/0174891 | A1 | 6/2014 | Mayer | |
| 2016/0272440 | A1 | 9/2016 | Mayer | |

FOREIGN PATENT DOCUMENTS

| | | | | |
|---|---|---|---|---|
| DE | 102013206510 A1 | 6/2014 | | |
| EP | 0274229 A2 * | 7/1988 | | B65G 47/084 |
| EP | 0274229 A2 | 7/1988 | | |
| EP | 2878556 A1 * | 6/2015 | | B65G 47/084 |
| EP | 2878556 A1 | 6/2015 | | |
| WO | 2004011209 A1 | 2/2004 | | |
| WO | WO-2004011209 A1 * | 2/2004 | | B26D 7/32 |

* cited by examiner

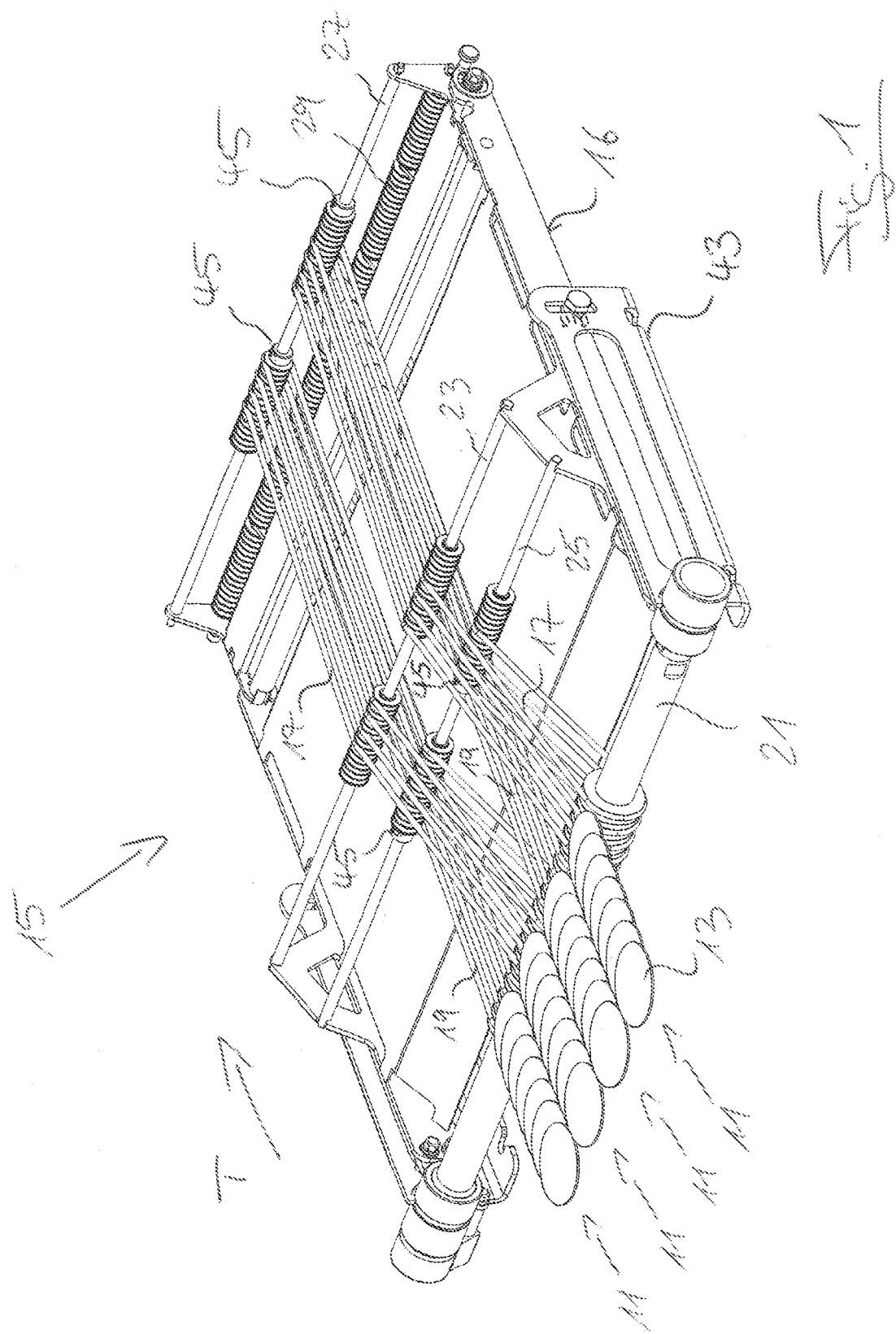

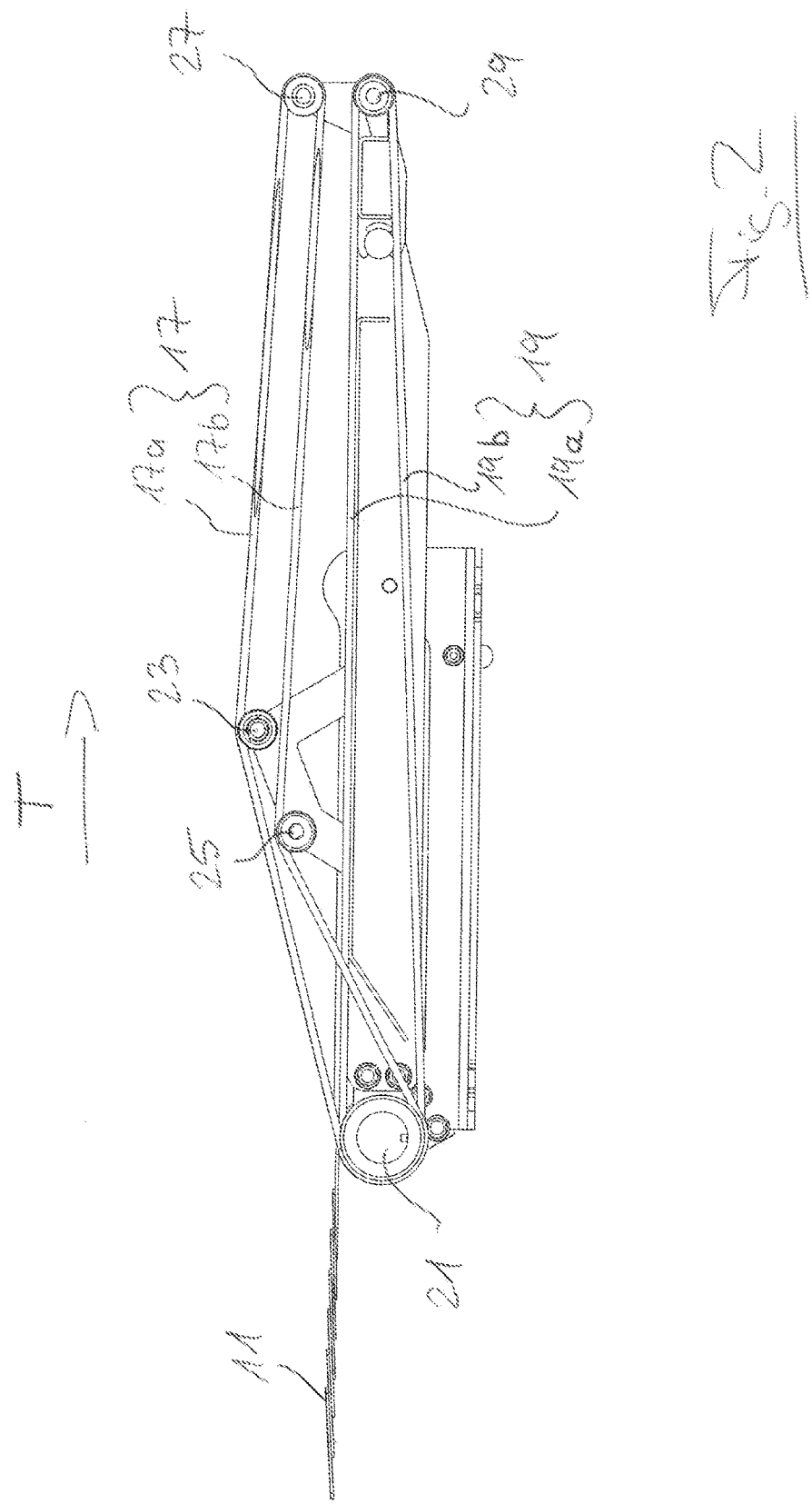

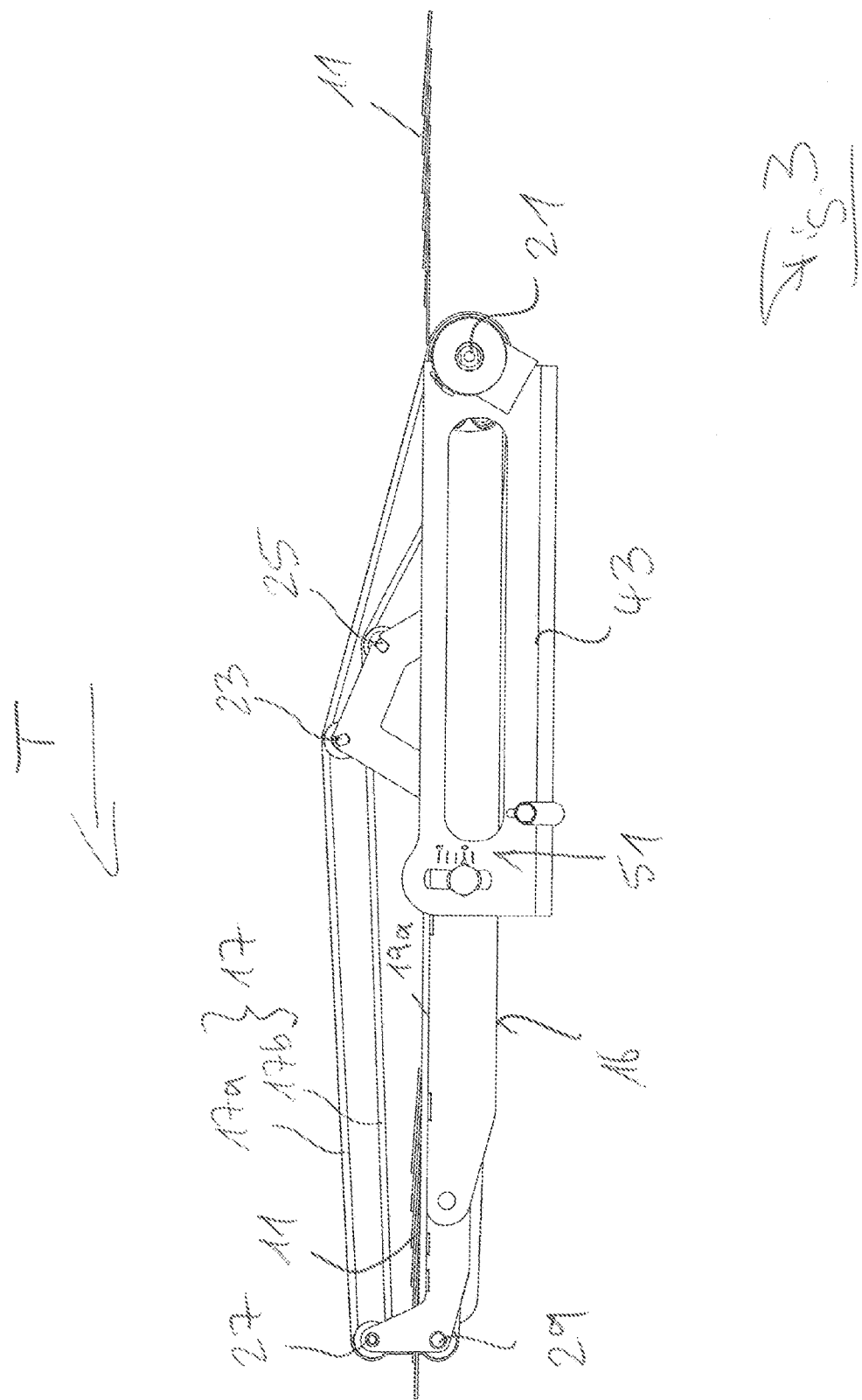

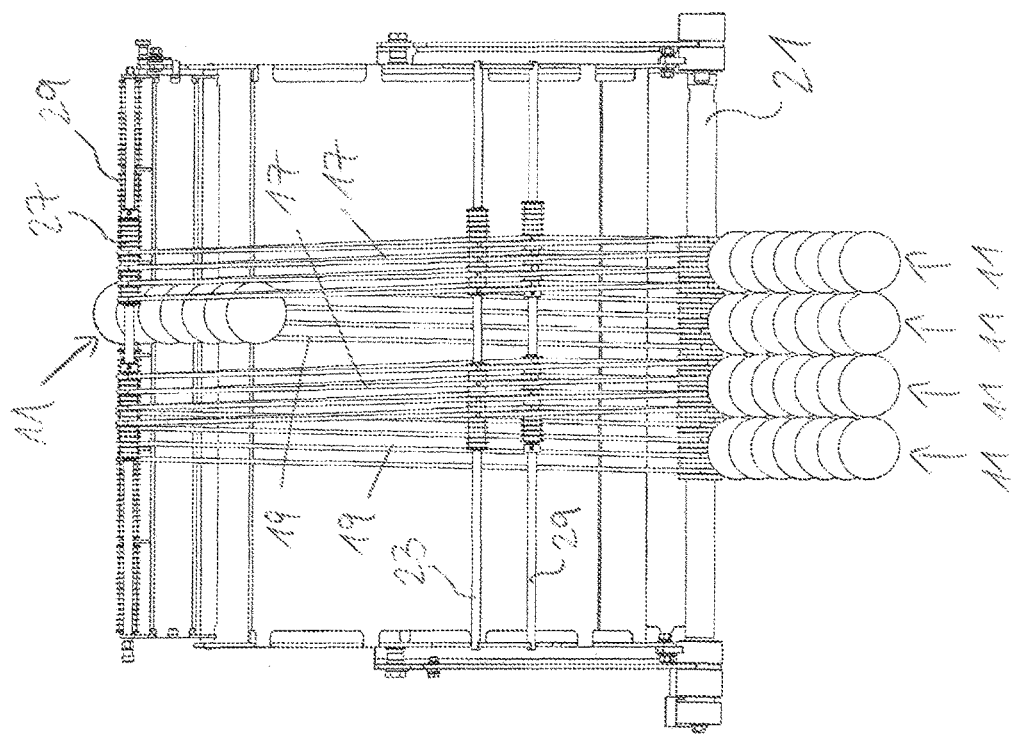

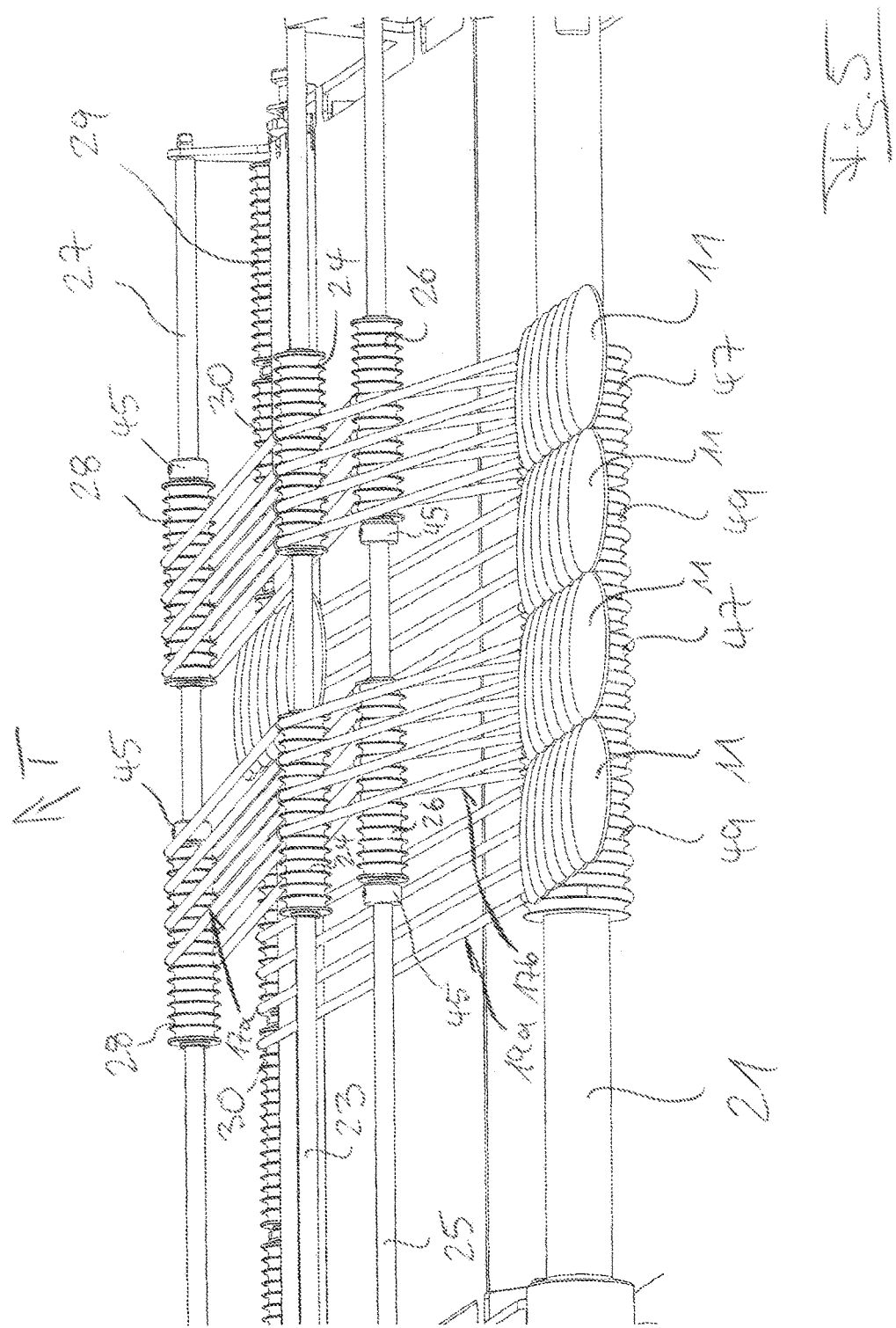

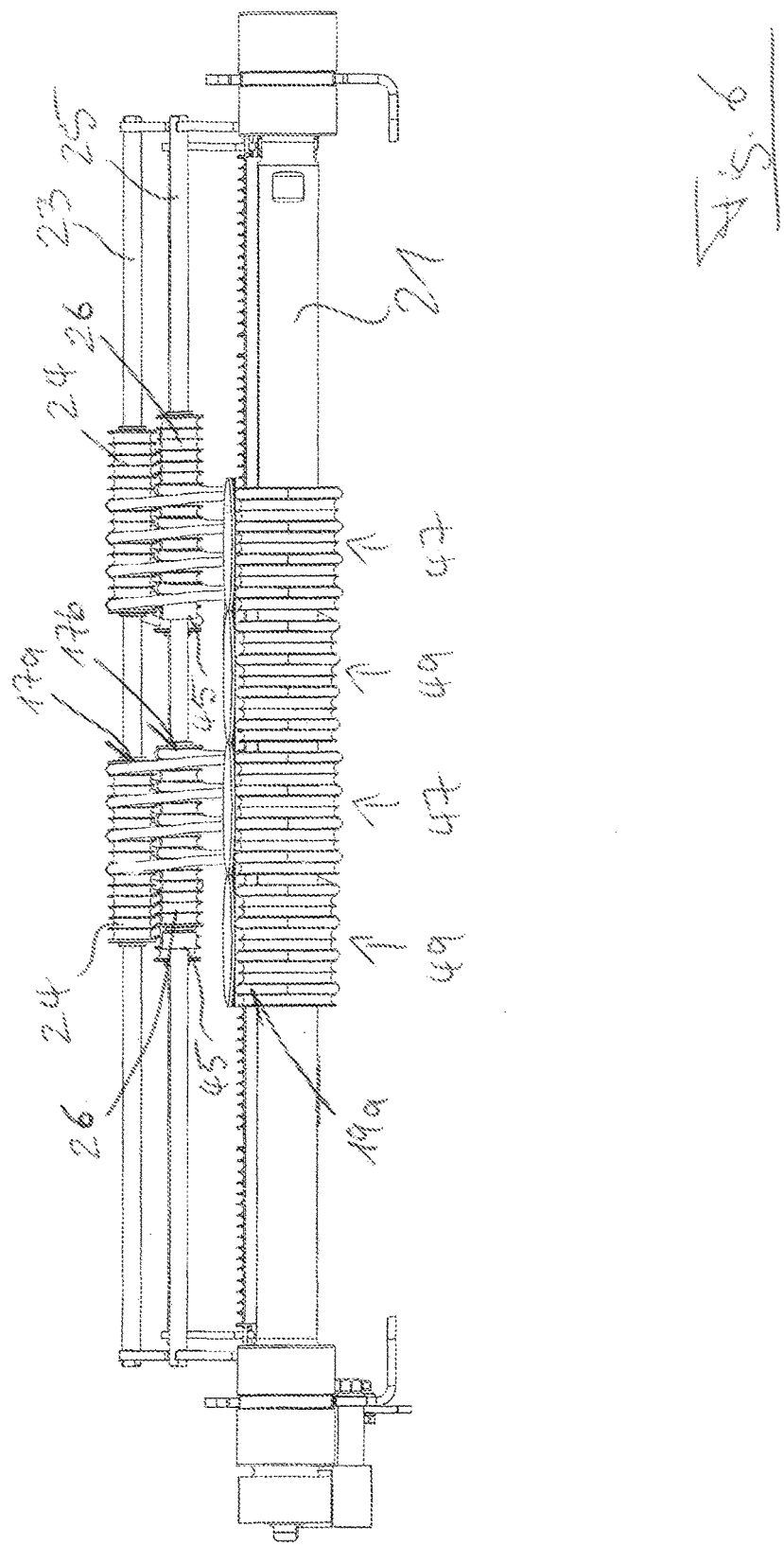

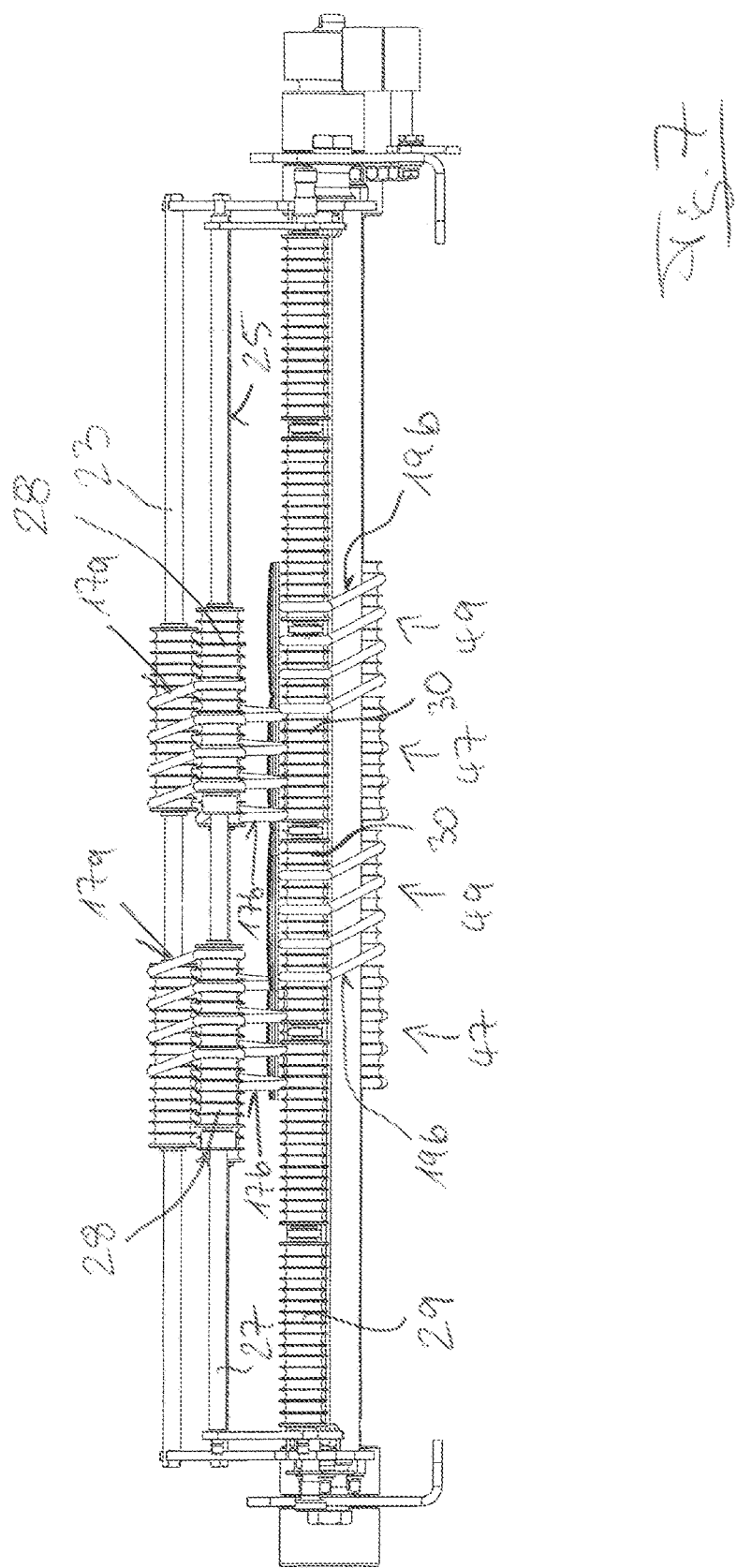

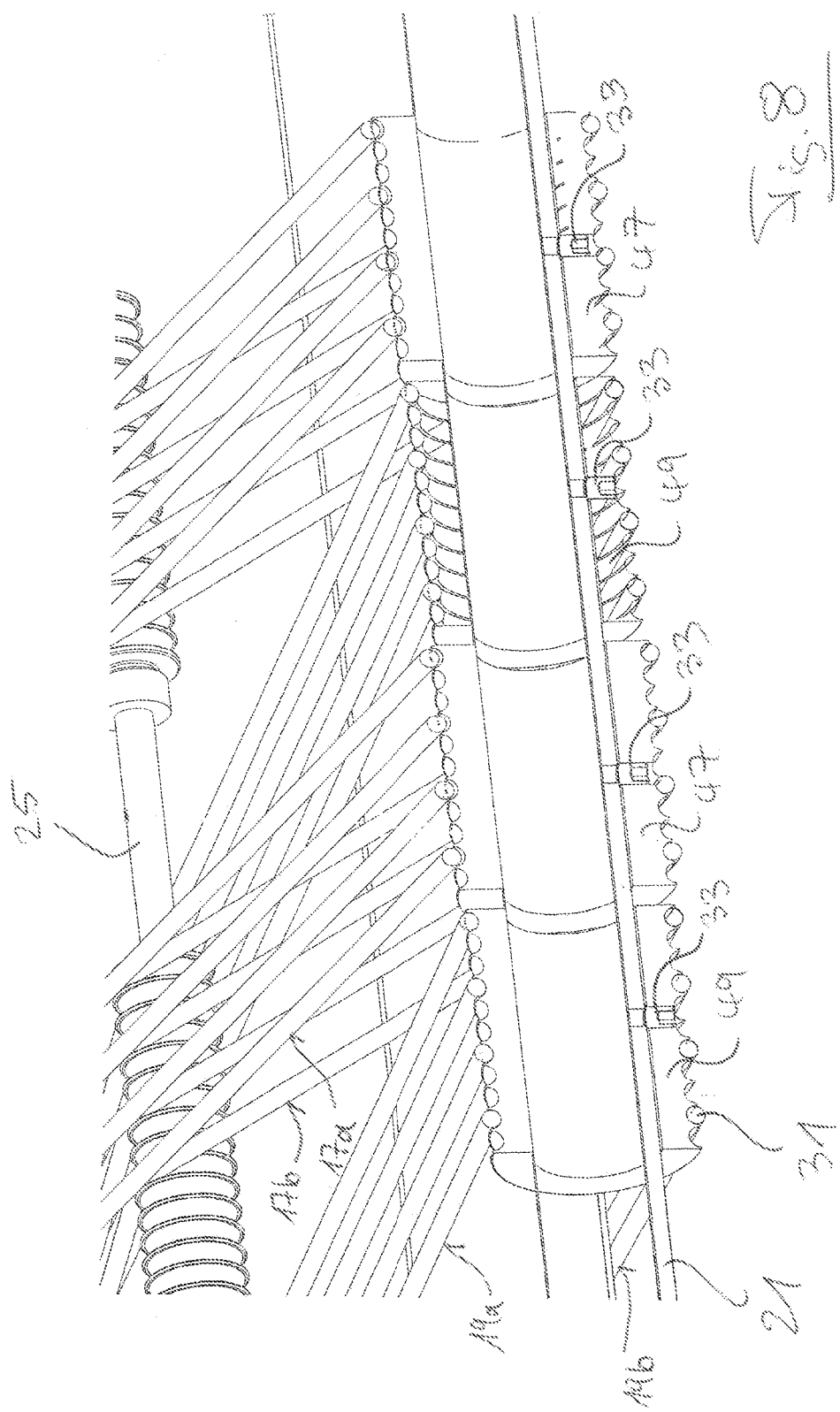

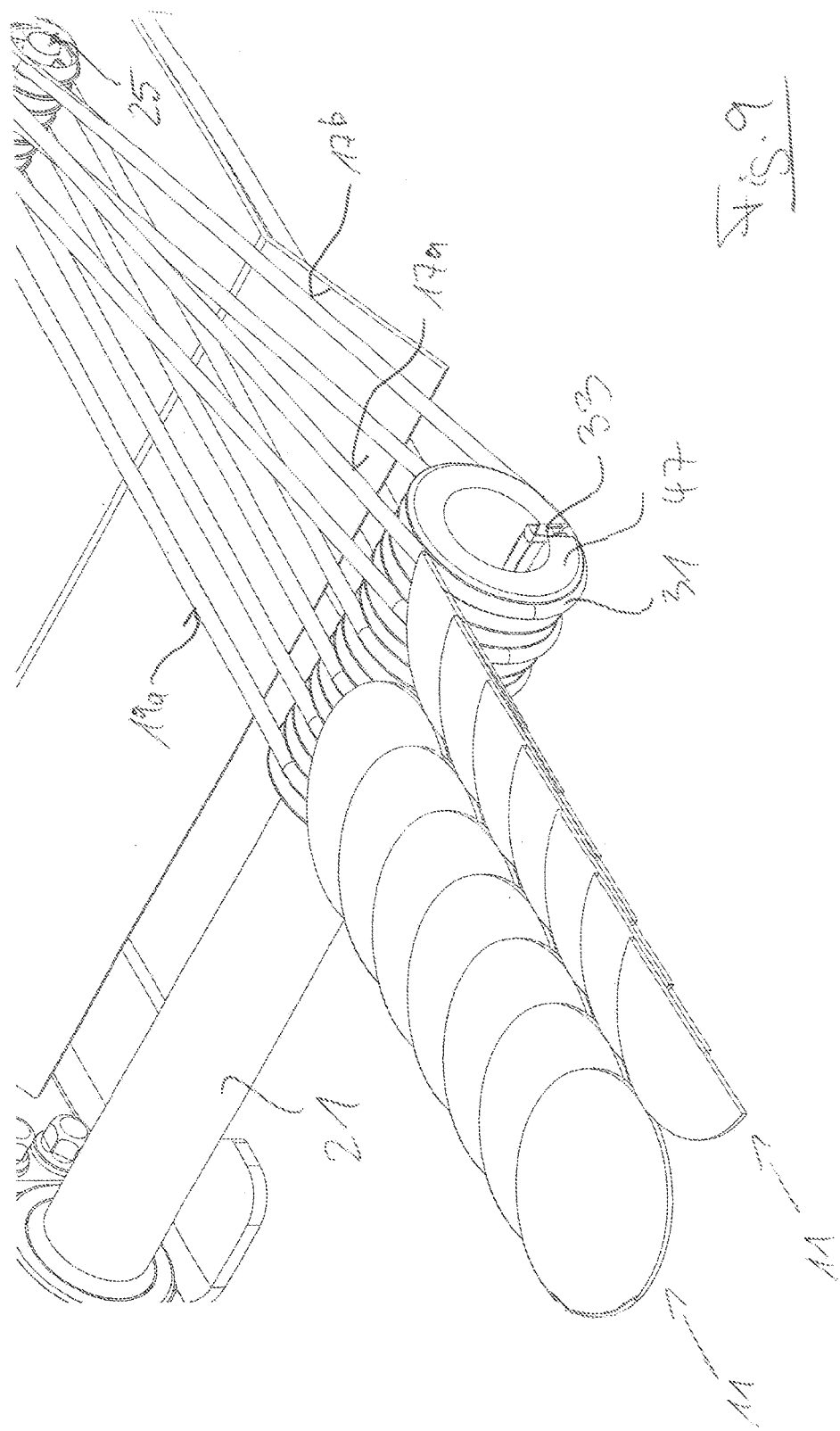

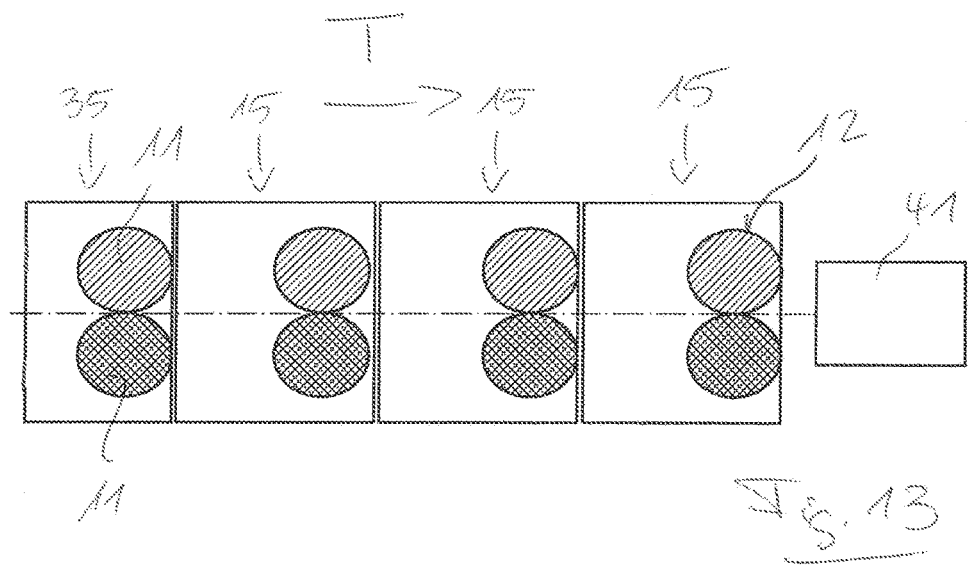

OVERLAPPING APPARATUS AND METHOD

CROSS REFERENCE TO RELATED APPLICATIONS

This is a Continuation Application of U.S. patent application Ser. No. 15/069,318, filed on Mar. 14, 2016, which claims priority to German Patent Application No. 102015104055.7, filed Mar. 18, 2015, the disclosure of each application being incorporated herein by reference in their entireties.

BACKGROUND

The subject matter disclosed herein relates to an apparatus and to a method for a lateral overlapping of portions which are transported in a longitudinal direction and which each comprise at least one slice cut off from a food product.

A lateral overlapping of portions can be necessary, for example, when a plurality of food products disposed next to one another such as loaves of sausage or cheese are simultaneously sliced by means of a slicing apparatus, e.g. by means of a high-speed slicer, and a single portion of one or more food slices is thereby generated in each track. It is namely frequently desired in practice to form total portions from, for example, two such single portions, wherein said total portions should each be placed at a downstream packaging apparatus into a packaging provided for sales and should be presented therein in the form of laterally overlapped single portions.

A lateral overlapping of portions has previously typically taken place by means of conveying devices of relatively long construction whose construction length can, for example, amount to 3 to 4 m. Known overlappers comprise two belt conveyers which are arranged in a continuous separate manner above one another in different planes and with which a so-called rocker is associated at the input side by means of which a part of the incoming portions is conducted to the upper conveying plane and another part of the incoming portions is conducted to the lower conveying plane. A portion from the upper conveying plane is then placed from the upper conveying plane onto a portion transported in the lower conveying plane at the end of the upper conveying plane. Each of the two conveying planes is provided with at least one separate drive so that the conveying speeds can be set accordingly. A further drive is required for the separate associated rocker at the input side.

Known overlappers therefore not only need a lot of room due to their length, but also have a complex and expensive structure since the two conveying planes and the rocker mean at least three independent belt conveyors have to be provided and have to be equipped with mutually independent drives. Such an effort and/or cost is appropriate and suitable for large throughput quantities, in particular with a permanent use of the overlapping function.

BRIEF DESCRIPTION

According to one aspect of the disclosure, an apparatus for the slicing of food products is provided, the apparatus having an apparatus for the lateral overlapping of portions which are transported in a longitudinal direction and which each comprise at least one slice cut off from a food product. The apparatus for the lateral overlapping of portions includes at least one overlapping unit which comprises a belt conveyor having at least two tracks. Also included is an upper track and a lower track of the belt conveyor each deflected at the incoming side about a common input axle and at the respective outgoing sides about two output axles disposed at different height levels. Further included is a common drive associated with the upper and lower tracks, the common input axle of the upper and lower tracks being driveable with the common drive. The overlapping unit is integrated into a rack of the slicing apparatus.

According to another aspect of the disclosure, an apparatus for the slicing of food products is provided, the apparatus having an apparatus for the lateral overlapping of portions which are transported in a longitudinal direction and which each comprise at least one slice cut off from a food product. The apparatus for the lateral overlapping of portions at least one overlapping unit which includes a belt conveyor having at least two tracks. Also included is an upper track and a lower track of the belt conveyor each deflected at the incoming side about a common input axle and at the outgoing side about two output axles disposed at different height level. Further included is an intermediate deflection unit for the upper track that is arranged between the common input axle and the respective output axle. The overlapping unit is integrated into a rack of the slicing apparatus.

According to another aspect of the disclosure, an apparatus for the lateral overlapping of portions which are transported in a longitudinal direction and which each comprise at least one slice cut off from a food product is provided. The apparatus includes at least one overlapping unit which comprises a belt conveyor having at least two tracks, the belt conveyor comprising a plurality of conveyor belts to form each of the at least two tracks. Also included is an upper track and a lower track of the belt conveyor each deflected at the incoming side about a common input axle and at the respective outgoing sides about two output axles disposed at different height levels. Further included is a common drive associated with the upper and lower tracks, the common input axle of the upper and lower tracks being driveable with the common drive.

According to another aspect of the disclosure, an apparatus for the lateral overlapping of portions which are transported in a longitudinal direction and which each comprise at least one slice cut off from a food product is provided. The apparatus includes at least one overlapping unit which comprises a belt conveyor having at least two tracks, the belt conveyor comprising a plurality of conveyor belts to form each of the at least two tracks. An upper track and a lower track of the belt conveyor are deflected at the incoming side about a common input axle and at the outgoing side about two output axles disposed at different height levels. Further included is an intermediate deflection unit for the upper track that is arranged between the common input axle and the respective output axle.

According to another aspect of the disclosure, a method for forming total portions which each comprise at least two laterally overlapping portions which each comprise at least one slice cut off from a food product is provided. The method includes supplying the two portions in tracks disposed next to one another to an overlapping unit which comprises a belt conveyor associated with the two tracks one of which is an upper track leading to an upper height level and the other of which is a lower track leading to a lower height level, the belt conveyor comprising a plurality of conveyor belts to form each of the at least two tracks. The method also includes conveying an upper portion by means of the upper track above a lower portion conveyed by means of the lower track. The method further includes driving a common input axle of the upper and lower tracks with a common drive associated with the upper and lower tracks. The method yet further includes subsequently placing the upper portion onto the lower portion, wherein the upper track and the lower track are disposed at different height levels next to one another at the incoming side and laterally overlapping at the outgoing side.

According to another aspect of the disclosure, a method for forming total portions which each comprise at least two laterally overlapping portions which each comprise at least one slice cut off from a food product is provided. The method includes supplying the two portions in tracks disposed next to one another to an overlapping unit which comprises a belt conveyor associated with the two tracks one of which is an upper track leading to an upper height level and the other of which is a lower track leading to a lower height level, the belt conveyor comprising a plurality of conveyor belts to form each of the at least two tracks. The method also includes conveying an upper portion by means of the upper track above a lower portion conveyed by means of the lower track. The method further includes varying a direction of the upper track with an intermediate deflection unit that is arranged between a common input axle and an output axle. The method yet further includes subsequently placing the upper portion onto the lower portion, wherein the upper track and the lower track are disposed at different height levels next to one another at the incoming side and laterally overlapping at the outgoing side.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a perspective view of an overlapping unit in accordance with an embodiment of the invention configured as a cassette;

FIGS. 2 and 3 are respective side views of the overlapping unit of FIG. 1;

FIG. 4 is a plan view of the overlapping unit of FIG. 1;

FIGS. 5-9 are respective part views of the overlapping unit of FIG. 1; and

FIGS. 10-13 are a respective possible application in accordance with the invention with a plurality of specifically configured overlapping units in accordance with the invention.

DETAILED DESCRIPTION

Figure 10:
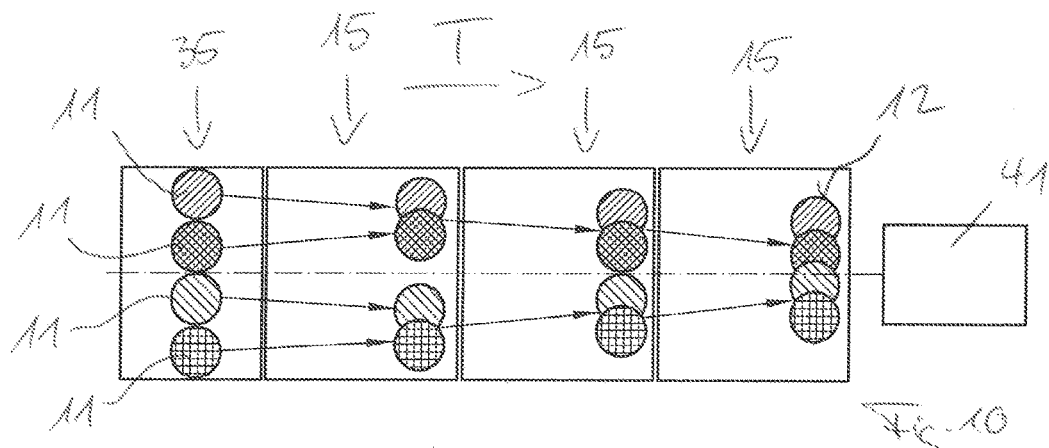

The overlapping unit 15 in accordance with the invention shown is configured as a cassette which can be coupled with a substructure, not shown, for example a rack of a slicer or a rack forming an element of a conveying path. The overlapping unit 15 is provided with a frame-like base 16 for this coupling. The overlapper cassette 15 shown can consequently be handled as a whole and thus forms a module which can be removed from and reinserted into a respective substructure or rack as a whole.

The base frame 16 supports a belt conveyor which in the embodiment shown comprises two track pairs which each comprise an upper track 17 and a lower track 19 which are arranged alternately next to one another in the transverse direction.

This belt conveyor defines a longitudinal direction T between an input axle 21 at the incoming side configured as a common drive shaft for all the tracks 17, 19 and two passive, bar-shaped output axles 27, 29.

Each track 17, 19 comprises a plurality of conveyor belts which are deflected at the incoming side about the common input axle 21 and at the output side about the output axles 27, 29 at different height levels and disposed approximately vertically above one another.

The guidance of the upper tracks 17 is additionally defined by two deflection axles 23, 25 which are in turn passive and bar-shaped and which form an intermediate deflection unit for the respective upper track 17 which will be looked at in more detail in the following. The two deflection axles 23, 25 are attached to a common rocker arm 43 which is pivotable about the common input axle 21. The position of the intermediate deflection unit for the upper tracks 17 formed by the two deflection axles 23, 25 can hereby be varied relative to the base 16 and thus relative to the input axle 21 and to the output axles 27, 29 which are supported at the base 16.

Each track pair 17, 19 serves to transport in a longitudinal direction T two incoming portions 11, which here respectively comprise a plurality of slices 13 arranged overlapping in the longitudinal direction T and cut off from a food product by means of a slicer and to place them on one another with a respective predefined transverse offset, that is with a respective predefined lateral overlap. In this respect—viewed in the longitudinal direction T—a respective left portion 11 is conveyed by means of the lower track 17 and a respective right portion 11 is conveyed by means of the upper track 17 so that both portions 11 are disposed at different height levels at the outgoing end of the overlapping unit 15. In this respect, the left portion 11 is conveyed by means of the upper, forward running run of the lower track 19 and the right portion 11 is conveyed by means of the upper, forward running run of the upper track 17.

Grooved deflection sleeves serve for the deflection of the conveyor belts forming the tracks 17, 19; they will be looked at in more detail in connection with the FIGS. 5 to 8 and are arranged on the respective axle. The deflection sleeves on the two output axles 27, 29 and on the two intermediate deflection axles 23, 25 are freely rotatable, whereas the deflection sleeves at the incoming side are rotationally fixedly coupled to the drive shaft 21 forming the input axle.

When the shown overlapper cassette 15 is coupled to the above-mentioned substructure, the drive shaft 21 is connected to a drive motor, not shown, for example via a belt drive or a toothed gear drive, whereby the drive shaft 21 can be set into rotation to drive the conveyor belts of the individual tracks 17, 19 together.

The transverse position of the individual deflection sleeves is variable. The deflection sleeves can be fixed in a respective set transverse position. This will be looked at in more detail in the following.

The overlapping unit 15 in accordance with the invention can be reconfigured fast and simply in this manner for matching to a respectively desired application.

The guidance of the runs 17a, 17b of the upper track 17 and of the runs 19a, 19b of the lower track 19 can in particular be seen from the side views of FIGS. 2 and 3.

The two runs 19a, 19b of the lower track 19 each extend in a straight line between the input axle 21 and the associated output axle 29, with the upper run 19a being at least substantially disposed in a horizontal plane during operation. The diameter of the output axle 29 is smaller than the diameter of the input axle 21.

The intermediate deflection unit formed by the intermediate deflection axles 23, 25 is arranged approximately in the region of a third—viewed in the longitudinal direction T—of the longitudinal extent of the overlapping unit 15 between the input axle 21 and the output axles 27, 29. The upper deflection axle 23 disposed closer to the output axles 27, 29 lies above the output axle 27 of the upper track 17 as well as above the lower intermediate deflection axle 25 which is disposed closer to the input axle 21 and which is disposed at approximately the same height level as the output axle 27 of the upper track 17.

Two things are hereby achieved: On the one hand, both runs 17*a*, 17*b* of the upper track 17 extend sufficiently far above the upper run 19*a* of the lower track 19 for the remaining conveying path up to the output axle 21. On the other hand, it is ensured that the lower run 17*b* of the upper track 17 is so-to-say "drawn upwardly" in the region at the input side and thus arrives earlier at a height level disposed sufficiently far above the upper run 19*a* of the lower track 19 than without this intermediate deflection unit, wherein the "drawing up" of the upper run 17*a* of the upper track 17 by means of the other intermediate deflection axle 23 ensures that the upper run 17*a* remains above the lower run 17*b* of the upper track 17 in the region at the input side.

The lower intermediate deflection axle 25 at the input side additionally has the effect of an offset of the lower run 17*b* of the upper track 17 in the transverse direction, which will be looked at in more detail in the following.

The diameters of the two output axles 27, 27 and their vertical spacing are selected such that a portion 11 conveyed on the upper run 19*a* of the lower track 19 is not impeded, but simultaneously a clean placing down of a portion 11 conveyed by means of the upper run 17*a* of the upper track 17 onto a portion conveyed by means of the lower track 19 is ensured.

The rocker arm 43 supporting the intermediate deflection axles 23, 25 which is provided with a scale 51 at which the position of the intermediate deflection axles 23, 25 relative to the base 16 can be read off can in particular be seen from FIG. 3. In addition, a portion 11 disposed at the outgoing side on the upper run 19*a* of the lower track is shown in FIG. 3, the height of which portion is smaller than the vertical spacing between the lower run 17*b* of the upper track 17 and the upper run 19*a* of the lower track at the end of the overlapping unit 15 at the outgoing side.

It can in particular be seen from FIG. 4 that, viewed in the longitudinal direction T, for each track pair, the respective lower track 19 and the upper track 17 extend toward one another obliquely to the longitudinal direction T and thus in the longitudinal direction T from an arrangement next to one another at the incoming side into an arrangement laterally overlapping above one another at the outgoing side.

The difference in the extent of the upper run 17*a* to the lower run 17*b* of the upper track 17, and indeed in relationship with the extent of the upper run 19*a* of the lower track 19 can in particular be seen from FIG. 5, which shows a perspective part view approximately in the longitudinal direction T. A transverse offset of the lower run 17*b* relative to the upper run 17*a*, to the right in FIG. 5, at the input side is namely effected by means of the grooved deflection sleeve 26 of the lower intermediate deflection axle 25. It is hereby ensured that the lower run 17*b* of the upper track only comes into lateral overlap with the upper run 19*a* of the lower track when the height predefined by the lower intermediate deflection unit 25 above the upper run 19*a* of the lower track is reached. In other words, at the input side, the lower run 17*b* is "held away" laterally from the upper run 19*a* of the lower track to ensure a sufficient clear height or passage height for a portion 11 lying on the upper run 19*a* of the lower track.

This lateral holding away of the lower run 17*b* of the upper track additionally has the advantage that the restoring force of the conveyor belts deflected by the holding away urges the grooved deflection sleeve 26 in the opposite direction, that is to the left in FIG. 5. Consequently, for the fixing of the transverse position of the deflection sleeve 26, a fixing is only required at one side, here that is the left side, which fixing is provided in the embodiment shown in the form of a clamping ring 45 which can be fixed in the respective desired transverse position e.g. by means of a screw at the bar forming the deflection axle 25.

It can also be seen from FIG. 6 that at the input side up to the, viewed in the longitudinal direction T, first lower intermediate deflection axle 25, the lower run 17*b* of the upper track 17 does not extend in parallel with the upper run 17*a*, but rather slightly obliquely to the longitudinal direction T, in the sense opposite the upper run 17*a*, so that the lower run 17*b* at the input side remains outside the region above the upper run 19*a* of the lower track 19.

It can furthermore be seen from FIG. 6 that the deflection sleeves 47, 49 rotationally fixedly arranged on the common drive shaft 21 for the two tracks 17, 19 of each track pair have a different diameter which is respectively smaller for the upper track 19 than that for the lower track 17. Due to this respectively larger deflection path for the upper track 17 at the drive shaft 21, the conveyor belts of the upper track 17 run at a greater conveying speed than that of the lower track 19. The diameter difference is dimensioned such that the difference in the conveying speeds of the two tracks 17, 19 resulting therefrom just compensates the conveyor length difference between the two tracks 17, 19 which is caused by the different extent of the upper track 17 relative to the lower track 19. It is hereby achieved that the portion 11 of the lower track 19, on the one hand, and the portion 11 of the upper track 17, on the other hand, have no offset in the longitudinal direction T in the respective total portions formed.

As explained in the introductory part, a respective desired longitudinal offset differing from zero can alternatively be directly predefined between the portions 11 in that the diameter difference at the common drive shaft 21 or at another point is selected accordingly, that is generally a corresponding conveyor length difference between the two tracks 17, 19 is effected which corresponds to the respective desired longitudinal offset.

Other and/or additional deflections for at least one of the two tracks 17, 19 and/or additional adjustment possibilities for the deflections provided in the embodiment shown can also be provided for such settings.

The transverse offset of the lower run 17*b* of the upper track—to the left here in FIG. 7—with respect to the upper run 17*a* in the region at the incoming side can inter alia also be seen from FIG. 7 which shows a front view of the overlapping unit 15 in accordance with the invention in a direction opposite to the longitudinal direction T.

It can furthermore be recognized in FIG. 7 by a comparison of the transverse positions of the deflection sleeves 30 of the lower output axle 29 and of the deflection sleeves 28 of the upper output axle 27 that, with the transverse positions of these deflection sleeves 28, 30 selected here, a lateral overlap is set which approximately corresponds to the transverse spacing of two conveyor belts extending directly adjacent to one another.

FIG. 8 in particular shows a cross-section through the common drive shaft 21 at the end of the overlapping unit 15 at the input side. As already mentioned at another passage, the cross-sectional shape of the grooves of the deflection sleeves 47, 49 is adapted to the cross-section of the conveyor belts 31. This cross-section is circular in the embodiment shown here, with other cross-sectional shapes also being possible, however.

The fixing in the transverse direction as well as the rotationally fixed coupling of the deflection sleeves 47, 49 on the drive shaft 21 take place for each deflection sleeve 47, 49 by a clamping screw 33 which respectively engages through an opening in the jacket of the deflection sleeve 47, 49 into a transverse groove of the drive shaft 21. This manner of a releasable fixing and thus adjustability of the deflection sleeves 47, 49 in the transverse direction on the drive shaft 21 can also be seen from the sectioned part view of FIG. 9.

Some applications which are possible in accordance with the invention and in which a plurality of overlapping units 15 in accordance with the invention, such as have been described above in connection with FIGS. 1 to 9, can be used will be explained in the following purely by way of example with reference to FIGS. 10 to 13, wherein the overlapping units 15 are arranged directly downstream of a conveyor 35 which can in particular be the so-called first control belt of a high-speed slicer for the simultaneous slicing of a plurality of bar-shaped or loaf-shaped food products arranged disposed next to one another. The overlapping units 15 can in this respect form an element of the so-called portioning system of the slicer which inter alia comprises the shown conveyor 35. In this respect, the overlapping units 15 can each be configured in the form of a cassette and can be integrated into a rack belonging to the slicer. The installation preferably takes place at the position of a control belt.

In each of the shown applications, a total portion 12 is present at the end of the overlapping unit 15, which is the last, viewed in the longitudinal direction T, at the outgoing side, said total portion having been formed from two or more individual portions 11 which have been produced by means of the slicer, not shown.

A further device 41 of generally any desired configuration adjoins this "cascade" of overlapping units 15 arranged after one another in the longitudinal direction T and the total portions 12 formed by the overlapping units can be transported on or further processed by means of said further device. For example, formats of one or more total portions 12 can be formed on the device 41. The onward transport of the total portions 12 or of the formats formed therefrom can take place, for example, perpendicular to the longitudinal direction T or further in the longitudinal direction T.

In the application in accordance with FIG. 10, portions 11 run in via the conveyor 35 in four tracks disposed laterally next to one another. For reasons of simplicity, each portion 11 is shown here in the form of a circular slice. Each portion 11 can e.g. in accordance with the representation in FIG. 1 comprise a plurality of slices arranged overlapping in the longitudinal direction T.

The two respective outer portions are first laterally overlapped by means of a first overlapping unit 15, whereupon a combination of these two overlapping portions takes place by means of a second overlapping unit 15, whereupon finally an overlapping of the two inner single portions takes place by means of a third overlapping unit 15 so that the desired total portion 12 is completed. Portions of slices having a diameter (caliber) of approximately 60 mm can, for example, be laterally overlapped to form a total portion 12 having a portion width of a total of 160 mm.

Figure 11:
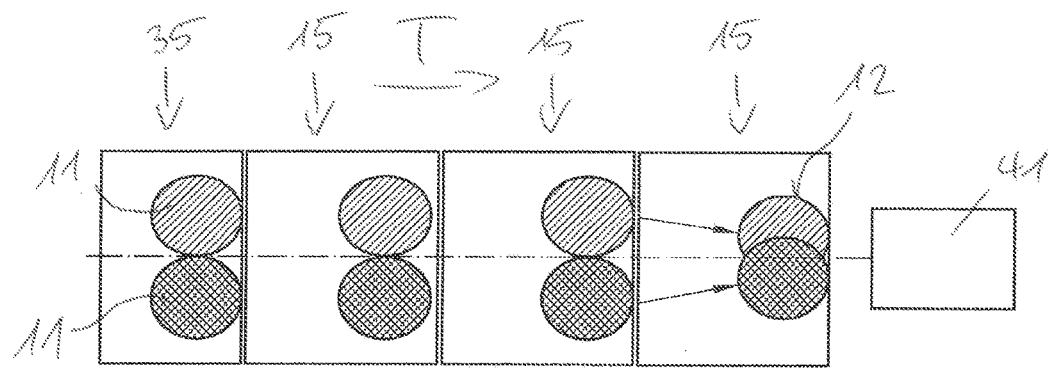

In the application in accordance with FIG. 11, the portions 11 are only incoming in two tracks, wherein the two first overlapping units 15 are only configured for "passage" and the transverse positions of the portions 11 can thus not be varied by these two first overlapping units 15. The desired total portion 12 is only formed by lateral overlapping by means of the third and final overlapping unit 15. It is consequently sufficient in the application in accordance with FIG. 11 if the overlapping units 15 each only have one track pair having a lower track and an upper track, whereas in the application in accordance with FIG. 10 the overlapping units 15 each have two such track pairs.

With the application in accordance with FIG. 11, for example, portions having a diameter (caliber) of 100 mm or of 90 mm can be laterally overlapped to form a total portion 12 having a portion width of a total of respectively 160 mm.

Figure 12:
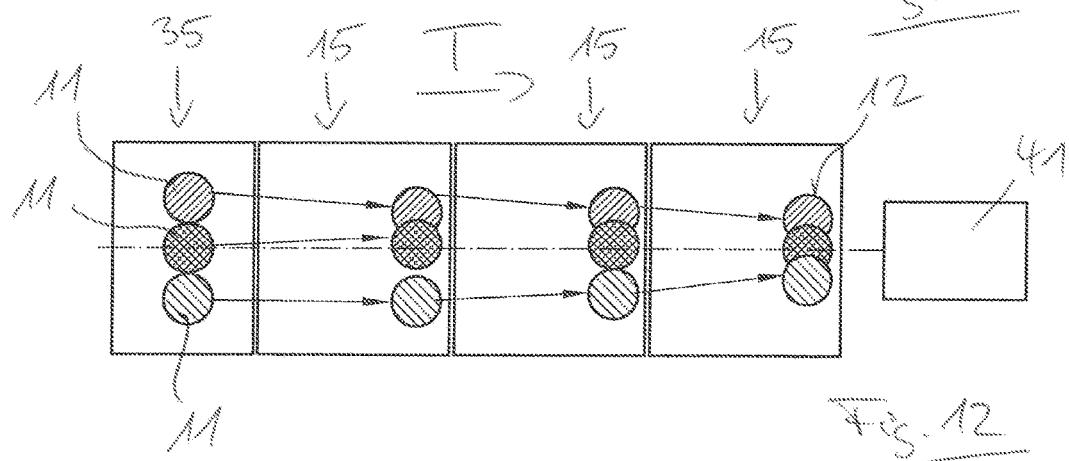

The application in accordance with FIG. 12 shows that portions 11 incoming in an odd number of tracks can be handled in a manner in accordance with the invention. The three portions 11 which are incoming disposed next to one another in this application are here guided such that first the two left portions 11 are laterally overlapped by means of the first overlapping unit 15, whereas the right portion 11 only passes through in the longitudinal direction T. Subsequently, the overlapping portion and the right portion are combined together by means of the second overlapping unit 15, whereupon the respective total portion 12 is then formed by means of the third and final overlapping unit 15, in which total portion the portion 11 originally incoming at the far right is disposed with a lateral overlap on the middle single portion.

With the application in accordance with FIG. 12, for example, portions 11 having a diameter (caliber) of 55 mm can be laterally overlapped to form a total portion 12 having a portion width of a total of 110 mm.

The total portions 12 can therefore generally in accordance with the invention be formed by means of a plurality of corresponding overlapping units 15 connected after one another in the longitudinal direction T successively by overlapping procedures taking place after one another in time at a respective one of the overlapping units, wherein one or more of the overlapping units 15 can, as required, effect either only a lateral combination without any overlapping effect or only a passage without a change of the relative transverse position.

Finally, FIG. 13 shows that a plurality of overlapping units 15 arranged after one another do not have to be used either for a lateral overlapping or for a lateral combination, but can rather each be configured "for passage". The total portion 12 then corresponds to the arrangement of the two single portions 11 at the incoming side.

FIG. 13 furthermore illustrates an option according to which, instead of the overlapper cassettes in accordance with the invention, conventional band cassettes can be used for a simple transport straight ahead.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

REFERENCE NUMERAL LIST

11 portion
12 total portion 13 slice
15 overlapping unit
16 base of the overlapping unit
17 upper track
19 lower track
21 common input axle, drive shaft
23 intermediate deflection unit
24 deflection sleeve
25 intermediate deflection unit
26 deflection sleeve
27 upper output axle
28 deflection sleeve
29 lower output axle
30 deflection sleeve
31 conveyor belt
33 clamping screw
35 conveyor
41 device
43 rocker arm
45 clamping ring
47 deflection sleeve for upper track
49 deflection sleeve for lower track
51 scale
T longitudinal direction, transport direction

What is claimed is:

1. An apparatus for the slicing of food products, having an apparatus for the lateral overlapping of portions which are transported in a longitudinal direction and which each comprise at least one slice cut off from a food product, the apparatus for the lateral overlapping of portions comprising:
    at least one overlapping unit which comprises a belt conveyor having at least two tracks;
    an upper track and a lower track of the belt conveyor each deflected at the incoming side about a common input axle and at the respective outgoing sides about two output axles disposed at different height levels; and
    a common drive associated with the upper and lower tracks, the common input axle of the upper and lower tracks being driveable with the common drive;
    wherein the overlapping unit is integrated into a rack of the slicing apparatus.

2. An apparatus for the slicing of food products, having an apparatus for the lateral overlapping of portions which are transported in a longitudinal direction and which each comprise at least one slice cut off from a food product, the apparatus for the lateral overlapping of portions comprising:
    at least one overlapping unit which comprises a belt conveyor having at least two tracks;
    an upper track and a lower track of the belt conveyor each deflected at the incoming side about a common input axle and at the outgoing side about two output axles disposed at different height levels; and
    an intermediate deflection unit for the upper track that is arranged between the common input axle and the respective output axle;
    wherein the overlapping unit is integrated into a rack of the slicing apparatus.

3. An apparatus for the lateral overlapping of portions which are transported in a longitudinal direction and which each comprise at least one slice cut off from a food product, the apparatus comprising:
    at least one overlapping unit which comprises a belt conveyor having at least two tracks, the belt conveyor comprising a plurality of conveyor belts to form each of the at least two tracks;
    an upper track and a lower track of the belt conveyor each deflected at the incoming side about a common input axle and at the respective outgoing sides about two output axles disposed at different height levels; and
    a common drive associated with the upper and lower tracks, the common input axle of the upper and lower tracks being driveable with the common drive.

4. The apparatus in accordance with claim 3, wherein the two output axles are arranged at least substantially vertically above one another.

5. The apparatus in accordance with claim 3, wherein the deflection position at the incoming side and/or at the outgoing side can be varied in a transverse direction for at least one of the upper and lower tracks.

6. The apparatus in accordance with claim 3, wherein a longitudinal offset of the portions conveyed in the upper and lower tracks can be set to a predefined measure by setting the conveying speeds of the upper and lower tracks relative to one another.

7. The apparatus in accordance with claim 3, wherein, as a compensation for a conveyor length difference between the upper and lower tracks, the conveying speeds of the upper and lower tracks are or can be set differently.

8. The apparatus in accordance with claim 3, wherein the upper and lower tracks differ from one another with respect to their deflection path at the input axle and/or at the output axles.

9. The apparatus in accordance with claim 3, further comprising a conveyor that is connected directly upstream of the overlapping unit and that has a conveying speed which lies between the conveying speeds of the upper and lower tracks.

10. The apparatus in accordance with claim 3, wherein both the upper track and the lower track extend obliquely to the longitudinal direction.

11. The apparatus in accordance with claim 3, wherein an intermediate deflection unit for the lower run of the upper track is configured to be active both in an inclination-varying manner and in a direction-varying manner.

12. The apparatus in accordance with claim 3, wherein both runs of the lower track each extend in a straight line between the input axle and the output axle.

13. The apparatus in accordance with claim 3, wherein the overlapping unit comprises a plurality of track pairs which are arranged next to one another in the transverse direction and which each have an upper track and a lower track.

14. The apparatus in accordance with claim 3, wherein the overlapping unit is configured as a cassette, namely as a module which is coupled in operation to a stationary substructure, which is removable and reinsertable as a whole and which comprises a base for coupling to the substructure and comprises the belt conveyor supported by the base.

15. The apparatus in accordance with claim 14, further comprising a drive motor for the cassette that is integrated into the substructure and that remains at the substructure with a removed cassette.

16. The apparatus in accordance with claim 3, wherein a plurality of overlapping units are connected after one another in the longitudinal direction.

17. An apparatus for the lateral overlapping of portions which are transported in a longitudinal direction and which each comprise at least one slice cut off from a food product, the apparatus comprising:
    at least one overlapping unit which comprises a belt conveyor having at least two tracks, the belt conveyor comprising a plurality of conveyor belts to form each of the at least two tracks;
    wherein an upper track and a lower track of the belt conveyor are deflected at the incoming side about a common input axle and at the outgoing side about two output axles disposed at different height levels; and an intermediate deflection unit for the upper track that is arranged between the common input axle and the respective output axle.

18. The apparatus in accordance with claim 17, wherein the two output axles are arranged at least substantially vertically above one another.

19. The apparatus in accordance with claim 17, wherein the deflection position at the incoming side and/or at the outgoing side can be varied in a transverse direction for at least one of the upper and lower tracks.

20. The apparatus in accordance with claim 17, wherein a longitudinal offset of the portions conveyed in the upper and lower tracks can be set to a predefined measure by setting the conveying speeds of the upper and lower tracks relative to one another.

21. The apparatus in accordance with claim 17, wherein, as a compensation for a conveyor length difference between the upper and lower tracks, the conveying speeds of the upper and lower tracks are or can be set differently.

22. The apparatus in accordance with claim 17, wherein the upper and lower tracks differ from one another with respect to their deflection path at the input axle and/or at the output axles.

23. The apparatus in accordance with claim 17, further comprising a conveyor that is connected directly upstream of the overlapping unit and that has a conveying speed which lies between the conveying speeds of the upper and lower tracks.

24. The apparatus in accordance with claim 17, wherein both the upper track and the lower track extend obliquely to the longitudinal direction.

25. The apparatus in accordance with claim 17, wherein an intermediate deflection unit for the lower run of the upper track is configured to be active both in an inclination-varying manner and in a direction-varying manner.

26. The apparatus in accordance with claim 17, wherein both runs of the lower track each extend in a straight line between the input axle and the output axle.

27. The apparatus in accordance with claim 17, wherein the overlapping unit comprises a plurality of track pairs which are arranged next to one another in the transverse direction and which each have an upper track and a lower track.

28. The apparatus in accordance with claim 17, wherein the overlapping unit is configured as a cassette, namely as a module which is coupled in operation to a stationary substructure, which is removable and reinsertable as a whole and which comprises a base for coupling to the substructure and comprises the belt conveyor supported by the base.

29. The apparatus in accordance with claim 28, further comprising a drive motor for the cassette that is integrated into the substructure and that remains at the substructure with a removed cassette.

30. The apparatus in accordance with claim 17, wherein a plurality of overlapping units are connected after one another in the longitudinal direction.

31. A method for forming total portions which each comprise at least two laterally overlapping portions which each comprise at least one slice cut off from a food product, the method comprising the steps of:

supplying the two portions in tracks disposed next to one another to an overlapping unit which comprises a belt conveyor associated with the two tracks one of which is an upper track leading to an upper height level and the other of which is a lower track leading to a lower height level, the belt conveyor comprising a plurality of conveyor belts to form each of the at least two tracks;

conveying an upper portion by means of the upper track above a lower portion conveyed by means of the lower track;

driving a common input axle of the upper and lower tracks with a common drive associated with the upper and lower tracks; and subsequently placing the upper portion onto the lower portion, wherein the upper track and the lower track are disposed at different height levels next to one another at the incoming side and laterally overlapping at the outgoing side.

32. The method of claim 31, wherein the total portions are each formed by means of a plurality of overlapping units connected after one another in the longitudinal direction successively by overlapping procedures taking place after one another in time at a respective one of the overlapping units.

33. The method of claim 31, wherein a longitudinal offset of the portions conveyed in the upper and lower tracks is set to a predefined measure by setting the conveying speeds of the upper and lower tracks relative to one another.

34. The method of claim 31, wherein a conveyor length difference between the upper and lower tracks is compensated in that the conveying speeds of the upper and lower tracks are set differently.

35. A method for forming total portions which each comprise at least two laterally overlapping portions which each comprise at least one slice cut off from a food product, the method comprising the steps of:

supplying the two portions in tracks disposed next to one another to an overlapping unit which comprises a belt conveyor associated with the two tracks one of which is an upper track leading to an upper height level and the other of which is a lower track leading to a lower height level, the belt conveyor comprising a plurality of conveyor belts to form each of the at least two tracks;

conveying an upper portion by means of the upper track above a lower portion conveyed by means of the lower track;

varying a direction of the upper track with an intermediate deflection unit that is arranged between a common input axle and an output axle; and subsequently placing the upper portion onto the lower portion, wherein the upper track and the lower track are disposed at different height levels next to one another at the incoming side and laterally overlapping at the outgoing side.

36. The method of claim 35, wherein the total portions are each formed by means of a plurality of overlapping units connected after one another in the longitudinal direction successively by overlapping procedures taking place after one another in time at a respective one of the overlapping units.

37. The method of claim 35, wherein a longitudinal offset of the portions conveyed in the upper and lower tracks is set to a predefined measure by setting the conveying speeds of the upper and lower tracks relative to one another.

38. The method of claim 35, wherein a conveyor length difference between the upper and lower tracks is compensated in that the conveying speeds of the upper and lower tracks are set differently.

* * * * *